US00RE35476E

United States Patent [19]

Levy

[11] E Patent Number: Re. 35,476

[45] Reissued Date of Patent: Mar. 11, 1997

[54] ELECTRICAL CONNECTOR BLOCK

[75] Inventor: Sidney Levy, Belle Mead, N.J.

[73] Assignee: Raychem Corporation, Menlo Park, Calif.

[21] Appl. No.: 233,728

[22] Filed: Apr. 26, 1994

Related U.S. Patent Documents

Reissue of:

[64] Patent No.: 4,993,966
Issued: Feb. 19, 1991
Appl. No.: 515,796
Filed: Apr. 27, 1990

U.S. Applications:

[63] Continuation of Ser. No. 18,758, Feb. 17, 1993, abandoned.

[51] Int. Cl.[6] ..... H01R 4/24

[52] U.S. Cl. ..... 439/411; 439/412; 439/604

[58] Field of Search ..... 439/389–425, 439/912, 604

[56] References Cited

U.S. PATENT DOCUMENTS

| | | | |
|---|---|---|---|
| 3,258,733 | 6/1966 | Elm | 439/411 |
| 4,127,312 | 11/1978 | Fleischhacker et al. | 339/99 R |
| 4,157,208 | 6/1979 | Roberts et al. | 439/410 |
| 4,176,895 | 12/1979 | Aldridge | 439/912 |
| 4,209,219 | 6/1980 | Proietto | 339/99 R |
| 4,240,687 | 12/1980 | Bunnell | 439/411 |
| 4,423,918 | 1/1984 | Filreis et al. | 439/412 |
| 4,449,777 | 5/1984 | Baribeau | 339/103 R |
| 4,550,965 | 11/1985 | Izraeli | 339/47 R |
| 4,632,486 | 12/1986 | Hasircoglu | 339/99 R |
| 4,652,071 | 3/1987 | DeBortoli | 339/99 R |
| 4,662,699 | 5/1987 | Vasantral et al. | 439/395 |
| 4,668,039 | 5/1987 | Marzili | 339/99 R |
| 4,741,480 | 5/1988 | Despault et al. | 439/412 |
| 4,764,125 | 8/1988 | Debortoli | 439/413 |
| 4,767,354 | 8/1988 | Saligny | 439/413 |
| 4,812,942 | 3/1989 | Kupferschmidt et al. | 361/119 |
| 4,826,449 | 5/1989 | Debortoli et al. | 439/411 |
| 4,846,721 | 7/1989 | Debruycker et al. | 439/411 |
| 5,096,437 | 3/1992 | Levy | 439/411 |

FOREIGN PATENT DOCUMENTS

| | | |
|---|---|---|
| 0042223 | 5/1981 | European Pat. Off. . |
| 0298713 | 7/1988 | European Pat. Off. . |
| 2662058 | 4/1989 | France . |

*Primary Examiner*—Steven C. Bishop
*Attorney, Agent, or Firm*—Herbert G. Burkard

[57] ABSTRACT

A connector block for connecting drop wires to conductors of a multi-conductor cable is disclosed. The connector block includes a housing having plural apertures therethrough and individual terminal modules which are insertable into the housing. The terminal modules may be inserted into the housing in plural different orientations to permit insertion of the drop wire from different directions, Each individual terminal module establishes electrical connection between a drop wire pair and a pair of conductors of the multiconductor cable.

40 Claims, 2 Drawing Sheets

ELECTRICAL CONNECTOR BLOCK

Matter enclosed in heavy brackets [ ] appears in the original patent but forms no part of this reissue specification; matter printed in italics indicates the additions made by reissue.

*This is a continuation of prior application Ser. No. 08/018,758, filed Feb. 17, 1993, now abandoned.*

FIELD OF THE INVENTION

The present invention relates to an electrical connector block for terminating electrical conductors. More particularly, the present invention relates to an electrical connector block which connects conductors of a multiconductor telecommunications cable to drop wires feeding local telephone distribution.

BACKGROUND OF THE INVENTION

In order to provide telephone service for local distribution (such as an individual home), it is necessary to tap into a multiconductor telecommunications cable which is typically run outdoors, either above or underground. The telephone industry currently employs connector blocks to establish such connection. Connector blocks of this type electrically terminate a group of conductors of the telecommunications cable fed thereto by a multiconductor stub cable. The conductors of the stub cable are electrically connected to drop wires which establish electrical service to the local distribution.

Examples of connector blocks currently being used in the telephone industry are shown in U.S. Pat. Nos. 4,449,777; 4,652,071; 4,826,449 and 4,846,721. Each of these patents describes a connector block including an elongate housing. The housing includes a plurality of electrical contacts fixed in the housing. Each contact connects a conductor of the stub cable to an individual drop wire. Individual caps or covers are supported over each contact, or pairs of contacts, to support the drop wires and to environmentally protect the connection thereto.

The devices of each of the above identified patents provide a given number of electrical contacts in fixed position in the housing. The drop wire must be inserted into the connector block in a given direction for every installation.

SUMMARY OF THE INVENTION

It is an object of the present invention to provide an electrical connector block which connects conductors of a multiconductor cable to electrical drop wires.

It is a further object of the present invention to provide an electrical connector block which employs a housing which accommodates individually insertable terminal modules which independently provide electrical connection between conductors of the multiconductor cable and drop wires.

It is a still further object of the present invention to provide an electrical connector block which permits insertion of the drop wire into the connector block from different directions.

In the efficient attainment of these and other objects, the present invention provides an electrical connector block for electrically connecting plural pain of conductors of a multiconductor cable to plural pain of drop wires. The connector block includes an elongate housing having a planar surface and plural apertures extending therethrough. A plurality of identical electrical terminal modules are provided for individual insertion into each aperture of the connector block housing. Each terminal module includes means for electrically interconnecting one pair of conductors from the multiconductor cable to the drop wire pair.

As more particularly described by way of the preferred embodiment, the terminal module is an elongate member having opposed ends and a front wall portion therebetween. The front wall includes an opening therethrough to provide access for the drop wire which is inserted therein. The terminal module my be positioned in the housing in plural positions such that the location of the drop wire entry opening may be changed with respect to the terminal block housing. This permits the drop wire to be inserted into the terminal module from different directions.

DETAILED DESCRIPTION OF THE PREFERRED EMBODIMENT

Figure 1:
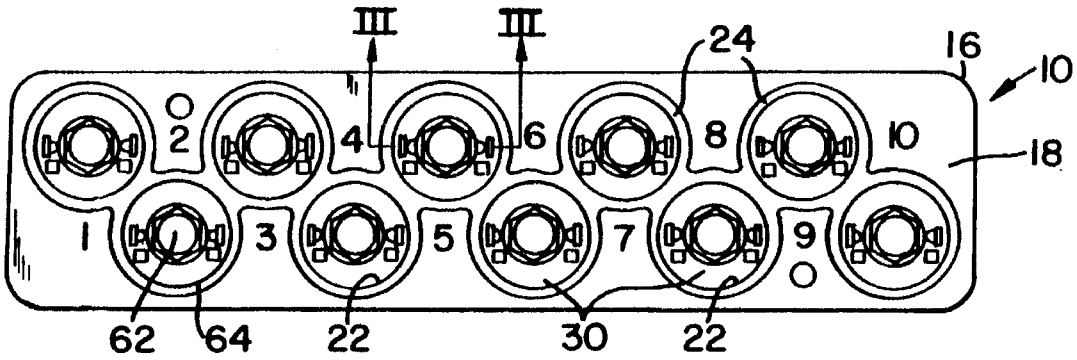
FIG. 1 is a top plan view of the electrical connector block of the present invention.
Figure 2:
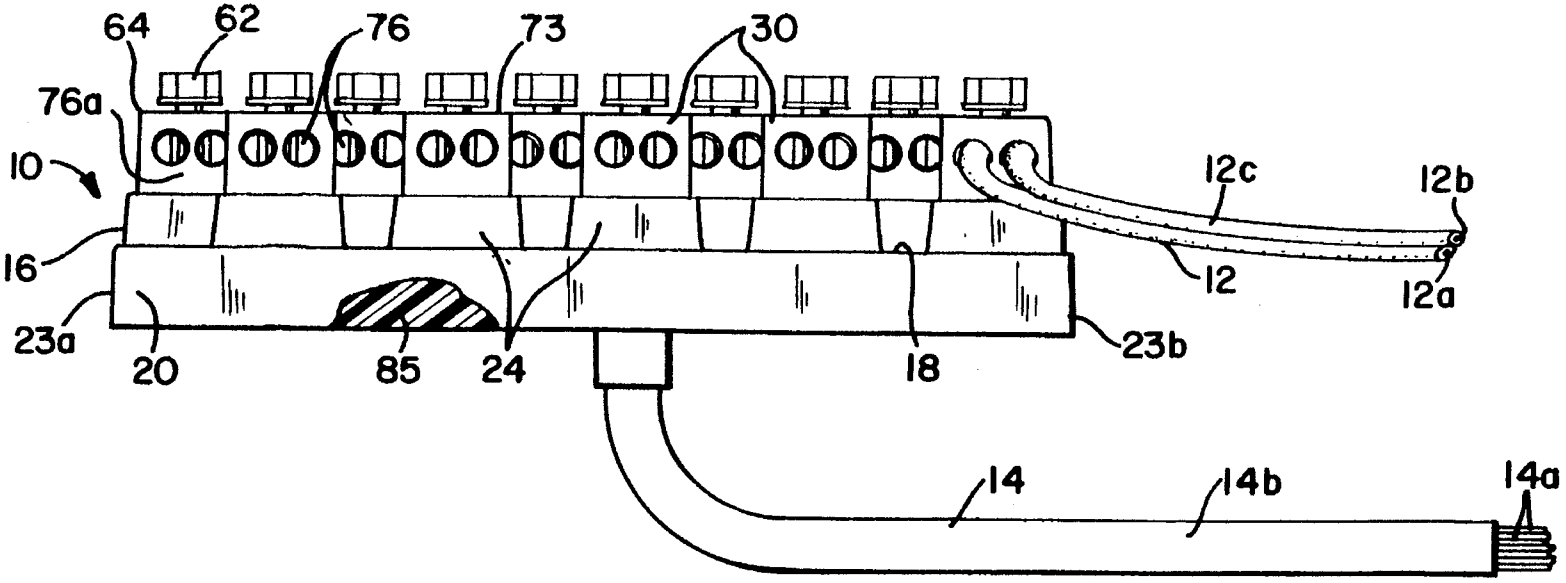
FIG. 2 is a side elevational showing of the connector block of FIG. 1 including a stub cable and a drop wire connected thereto.

As shown in FIGS. 1 and 2, an electrical connector block 10 of the present invention is used to connect a drop wire 12 to a stub cable 14. Connector block 10 is typically employed in the telephone industry to provide telephone service to local distribution, such as an individual customer's premises. Telephone service is supplied to the premises by drop wire 12. As shown in the present embodiment, drop wire 12 is a two conductor cable, wherein each individual conductor 12a and 12b is electrically isolated, but supported in a common insulated jacket 12c In use, one end of drop wire 12 is longitudinally slit to form a pair of side-by-side discrete insulated drop wires. Drop wires of this type are conveniently used in telephone applications, as telephone service is typically provided by two conductors, one designated tip, the other ring. The present invention may also be employed With discrete insulated single conductor cables. As used hereinthroughout the term drop wire may encompass the two conductor cable either as a pair or separately or a discrete insulated conductor.

In order to tap into an outdoor telecommunications cable (not shown), stub cable 14 is employed. Stub cable 14 includes a plurality of individually insulated conductors 14a, surrounded by an outer plastic jacket 14b. Connector block 10 of the present invention provides electrical connection between conductors 14a of stub cable 14 and conductors 12a and 126 of plural drop wires 12.

Figure 3:
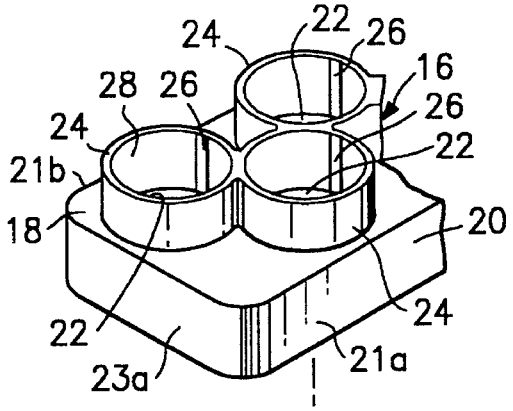
FIG. 3 is a sectional showing of a portion of the connector block of FIG. 1, taken along the lines III—III.
Figure 3:
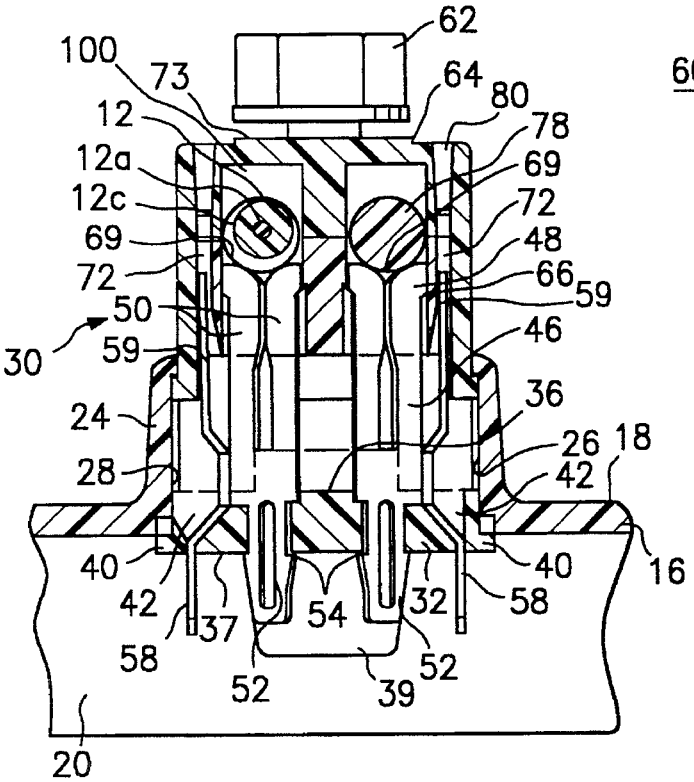
Figure 4:
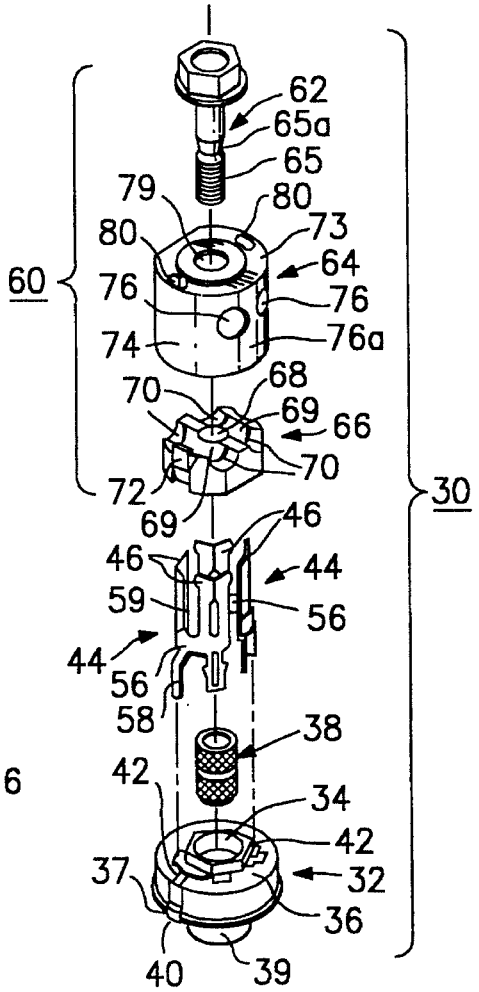
FIG. 4 is an exploded perspective view of a terminal module and a portion of a housing of the connector block of FIG. 1.

Referring additionally to FIGS. 3 and 4, connector block 10 may be further described. Connector block 10 includes an elongate housing 16 typically formed of molded plastic. Housing 16 is generally rectangular in shape, having an elongate planar surface is and a depending perimeterical skirt 20 defined by longitudinal front and back walls 21a and 21b and transverse end walls 23a and 23b. Planar surface 18 includes a plurality of circular apertures 22 extending therethrough. Apertures 22 are positioned in two staggered longitudinally extending rows. In the present embodiment ten apertures are shown. However, it is contemplated that housing 16 may be formed in any desired length to have greater or fewer apertures therein so as to provide connection to any number of drop wires 12. Housing 16 further includes an annular wall 24 cxtending upwardly from planar surface 18 and surrounding each circular aperture 22. For simplicity of manufacturer, adjacent annular walls 24 may be in intimate contact, however, discrete walls my also be employed. A pair of diametrically opposed vertical slots 26 are included on an inner surface 28 of each annular wall 24. Slots 26 extend upwardly from planar surface 18 and their function will be described in further detail hereinbelow.

As particularly shown in FIGS. 1 and 2, housing 16 supports in each circular aperture 22, an electrical terminal module 30. Each terminal module 30 is supportable within any one of annular walls 24 surrounding circular apertures 12. Terminal modules 30 are typically provided in like number to the number of circular apertures 22 provided in housing 16. However, if a particular installation calls for a lesser of connections, certain ones of the circular apertures 22 may remain empty.

Referring additionally to FIGS. 3 and 4, terminal module 30 of the present invention includes a base 32, which is generally disk shaped, having an central opening 34 through an upper surface 36 thereof. Opening 34 accommodates an internally threaded bolt receiving member 38 which is press fitted in fixed position therein. A depending base extension portion 39, which extends from an undersurface 37 of base 32, helps support bolt receiving member 38. Base 32 further includes a pair of diametrically opposed outwardly directed ribs 40 adjacent undersurface 37 thereof. Ribs 40 are adapted to fit within slots 26 of housing 16 to support and align base 32 therein, as will be described in further detail hereinbelow.

Base 32 further includes a pair of segmented slotted openings 42 positioned about opening 34. Segmented slotted openings 42 extend from upper surface 36 to undersurface 37. Supported in segmented slotted openings 42 of base 32 are a pair of identical electrical contact elements 44, which establish electrical connection between drop wire 12 and the conductors of stub cable 14 (FIG. 2).

Contact elements 44 are formed of a suitable metal, preferably copper, which exhibits desirable electrical and mechanical properties. Each of contact elements 44 includes a pair of drop wire engagement elements 46. Referring more specifically to FIG. 3, each of drop wire engagement elements 46 includes an upper insulation displacement portion 48, formed by a pair of opposed beams 50. Upper insulation displacement portion 48 functions in a conventional manner, to sever the jacket 12c of drop wire 12 and make electrical engagement with conductor 12a upon insertion therein. A lower portion 52 of drop wire engagement element 46 extends through segmented slotted opening 42 of base 32 to secure contact element 44 in base 32. Lower portion 52 includes outwardly directed shoulders 54, preventing withdrawal of contact element 44 from base 32. Drop wire engagement elements 46 of contact elements 44 are positioned at angular disposition with respect to one another. This angular orientation permits adjacent contact elements 44 to be positioned in close proximity to one another.

Each of drop wire engagement elements 46 of contact element 44 is supported to one another by horizontal bridge portion 56. Bridge portion 56 includes a downwardly extending lower terminal 58 positioned between adjacent lower portions 52. Lower terminal 58 extends through segmented slotted opening 42 below undersurface 37 or base 32. Lower terminal 58 electrically terminates conductors 14a of stub cable 14 (FIG. 2). Conductors 14a may be wire-wrapped around lower terminal 58 in a conventional manner.

Bridge portion 56 also includes tn upwardly directed probe element 59, extending oppositely from lower terminal 58 and positioned between spaced-apart insulation displacement portions 48. Probe clement 59 is positioned so that an external probe (not shown) may be engaged therewith for testing purposes as will be described in further detail hereinbelow.

Terminal module 30 further includes a closure subassembly 60, supported above contact elements 64. Closure subassembly 60 includes a bolt 62, a cap 64, and an intermediate support member 66.

Bolt 62 is a metallic member having a stem 65 threaded at its lower end. Bolt 65 is adapted for screw accommodation in bolt receiving member 38 supported in base 32.

Intermediate support member 66 is a plastic element having a central vertical aperture 68 extending therethrough for passage of stem 65 or bolt 62. Intermediate support member 66 includes s pair or side-by-side wire accommodating troughs 69, which as shown in FIG. 3, provide a lower nest for drop wire 12. Intermediate support member 66 includes slotted passages 70 therethrough which permit passage of upper insulation displacement portions 48 or contact elements 44. Slotted passages 70 are disposed within trough 69 so that upper insulation displacement portions 48 pass through trough 69 and into engagement with drop wire 12 supported thereby. Intermediate support member 66 further include a pair or opposed outboard vertical recesses 72, each of which permit passage of probe element 59 therethrough.

Cap 64 is an inverted cup-shaped member formed of a suitable plastic. Cap 64 includes an upper planar surface 73 and a depending substantially cylindrical wall 74. Cylindrical wall 74 includes a pair of side-by-side openings 76 along a front portion 76a thereof which permit individual insertion of drop wires 12 thereinto. Intermediate support member 66 is supported within the cylindrical wall 74 of cap 64. Opening 76 are aligned with wire accommodating troughs 69, which in combination, define a drop wire accommodating region 78.

Figure 5:
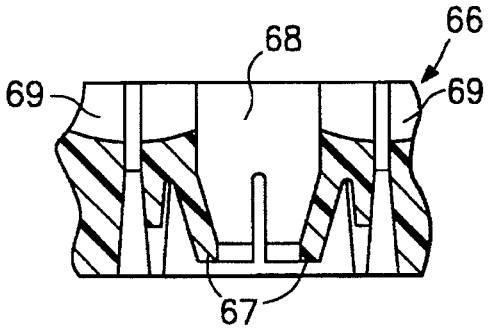
FIG. 5 is an enlarged fragmented vertical section of an intermediate support member of the terminal module shown in FIGS. 3 and 4.

Upper surface 73 of cap 64 includes a central bolt hole 79, which permits passage of the stem 65 of bolt 62 therethrough. Both cap 64 and intermediate support member 66 are supported in fixed position with respect to bolt 62 by employing locking fingers 67 (FIG. 5) within the central vertical aperture 68 of intermediate support member 66 which engage an undercut 65a on bolt 62. Thus, closure sub-assembly 60 is movable with respect to base 32 and contacts 64 supported therein, upon screw engagement of bolt 62 with bolt receiving member 58. Cap 64 further include a pair of diametrically opposed probe channels 80, which permit access to probe elements 59 extending through outboard recesses 72 of intermediate support member 66.

Connector block 10 of the present invention is used in the following manner: Base 32, including bolt receiving member 38 press fitted therein, supports contact elements 44 in fixed orientation. In a separate operation, closure sub-assembly 60 is assembled. Bolt 62 is passed through bolt hole 79 of cap 64 and central vertical aperture 68 of intermediate support member 66. The locking fingers 67 (FIG. 5) of intermediate support member 66 captively engage undercut 65a of bolt 62 to provide fixed engagement with bolt 62. Drop wire support region 78 defined between intermediate support member 66 and cap 64 may now be filled with a sealing gel [(not shown)] *100* (*FIG. 3*) introduced thereinto to environmentally protect the connection of contact element 44 to drop wires 12. Closure sub-assembly 60 is then attached to base 32 by partially screwing bolt 62 into bolt receiving member 38 in base 32. Terminal module 30 then may be inserted into housing 16 from below so that terminal module 30 seats within circular apertures 22. Ribs 40 of base 32 slide into slots 26 of annular wall 24 to align and support terminal module 30 to housing 16.

One advantage or the connector block 10 of the present invention is that terminal module 30 may be inserted in housing 16 in more than one orientation. For example, as shown in FIG. 4, ribs 40 of base 32 are diametrically opposed from one another, as are slots 26 of annular wall 24. Thus, terminal module 30 may be inserted in one of two positions. A first position is defined with openings 76 of cap 64 facing a rust direction adjacent longitudinal wall 21a of housing 16. A second position is defined where openings 76 of cap 64 face a second direction 180° opposite the first, adjacent longitudinal wall 21b of housing 16. This permits drop Wires 12 to be inserted from two different directions. In fact, it is contemplated that by various arrangements of ribs 40 and slots 26 the position of terminal module 30 in housing 16 may be infinitely varied. The variable positioning of terminal module 30 in housing 16 is a benefit to the installer as in typical installations, drop wires 12 extending from local distribution may be fed to connector block 10 from several different directions. The arrangement of terminal module 30 with respect to housing 16, eliminates the installer having to loop drop wire 12 either over or under the connector block 10.

Once the appropriate number of terminal modules 30 are supported in housing 16, conductors 144 of stub cable 14 (FIG. 2) may be connected thereto. Again, this step is typically performed in the factory where each individual conductor 144 is wire-wrapped in conventional fashion to lower terminal 58 of contact element 44. This wire-wrapping technique is well-known in the electrical connection art, and my be accomplished by hand or automatic tooling.

After conductors 14a of stub cable 14 are connected to contact elements 44, the rear of the housing 16 is filled with a self-hardening insulating medium or potting compound 85. This potting compound 85 serves two purposes. First, it electrically isolates and seals each of the individual connections of conductors 14a to lower terminals 58 and second, serves to permanently secure terminal modules 30 in housing 16.

Connection of drop wires 12 my now be accomplished by an installer in the field. Each individually inserted conductor 12a and 12b of drop wire 12 is inserted into drop wire accommodating region 78 between cap 64 and intermediate support member 66 of terminal module 30 through openings 76. The ends of drop wires 12 are supported from below by wire accommodating troughs 69 of intermediate support member 66, and from above by the upper surface 73 of cap 64. Excess gel within the drop wire accommodating region 78 is expelled back through openings 76. The screw tightening of bolt 62 to base 32 causes downward movement of closure sub-assembly 60, forcing the conductors 12a and 12b of drop wire 12 into insulation displacement connection with the upper insulation displacing portions 48 or contact elements 44. As is known in the electrical connection art, the upper insulation displacing portions 48 cut through insulation 12c to make electrical engagement with each of conductors 12a and 12b. Thus, electrical connection is established between drop wire 12 and conductors 14a of cable 14. As each of contact elements 44 includes a pair of spaced-apart integrally formed insulation displacing drop wire engagent elements 46, redundent electrical engagent is established between each drop wire 12 and contact element 44.

Disconnection of drop wire 12 from terminal module 30 may also be achieved by the present invention. Bolt 62 may be unscrewed from base 32, thereby raising closure sub-assembly 60 from base 32. This action pulls drop wires 12 off of upper insulation displacing portions 48 of contact elements 44, thus the disconnected drop wire may be removed, and another connection made.

Various changes to the foregoing described and shown structures would now be evident to those skilled in the art, Accordingly, the particularly disclosed scope of the invention is set forth in the following claims.

I claim:

1. An electrical connector block for electrically connecting plural pairs of conductors of a multiconductor cable to plural pairs of drop wires comprising:

an elongate terminal block housing having a planar surface and plural discrete apertures extending therethrough; and a plurality of identical electrical terminal modules, one module of said plurality insertably mounted in each aperture of said terminal block housing, each terminal module including means for electrically interconnecting one pair of said plural [paris] *pairs* of conductors of said multiconductor cable to one pair of said plural pain of drop wires.

2. An electrical connector block of claim 1 wherein each said electrical terminal module includes:

an electrically insulative body; and a pair of elongate electrical contacts supported in said body, said contacts including respective first connection end extents for electrical engagement with respective conductors of said multiconductor cable pair and second connection end extents for removable electrical engagement with respective drop wires of said drop wire pair;

wherein said electrically interconnecting means includes said pair of contacts.

3. An electrical connector block of claim 2 wherein said electrically insulative module body includes:

a base having an upper and a lower surface which supports said pair of contacts with said second connection end extents extending from said upper surface and said first connection end extents extending below said lower surface;

a cap secured to said base above said upper surface for movement toward and away from said base;

an intermediate member positioned between said cap and said base, said cap and said intermediate member defining a drop wire support region for supporting said drop wife pair adjacent raid second connection end extents of said pair of contacts; and securement means for captively securing said intermediate member to said cap for movement therewith and for providing said movable securement of said cap to said base;

whereby movement of said cap toward said base establishes said electrical engagement of said respective second connection end extents with said respective drop wires of said pair and movement of said cap away from said base removes said respective drop wires of said pair from electrical engagement with said respective second connection end extents.

4. An electrical connector block of claim 3 wherein said securement means includes an externally screw-threaded bolt supported by said cap and wherein said base includes an internally screw-threaded bolt support for screw-accommodation with said bolt.

5. An electrical connector block of claim 4 wherein said cap is cup-shaped, having a op wall and a depending side wall, said bolt passing through said top wall thereof.

6. An electrical connector block of claim 5 wherein intermediate member is captively supported within said cup-shaped cap by said bolt.

7. An electrical connector block of claim 6 wherein said cap side wall includes a pair of openings therethrough adjacent said intermediate member, said openings providing access to said drop wire support region.

8. An electrical connector block of claim 7 wherein said contact second end extends include insulation displacement elements.

9. An electrical connector block of claim 8 wherein said contacts include a probe arm extending through said intermediate member, said arm being externally electrically accessible.

10. An electrical connector block of claim 9 wherein said base, said cap and said intermediate member are generally cylindrical in shape and where said housing apertures are circular so as to accommodate said module.

11. A connector block assembly for electrically connecting a conductor of a multiconductor cable to a drop wire, said connector block comprising:

an elongate housing having opposed longitudinal walls and a planar surface extending therebetween, said housing including plural apertures through said planar surface; and at least one connector module insertably supportable in one of said housing apertures;

said module including;

and elongate electrical contact having a first connection end for electrical engagement with said conductor of said multiconductor cable and an opposed second connection end for electrical engagement with said drop wire;

an elongate insulative body supporting said electrical contact, said body having an upper end adjacent said second connection end of said contact, a lower end and an elongate front wall portion extending therebetween; said front wall portion including a drop wire entry opening adjacent said upper end for insertable receipt of said drop wire and for providing drop wire access to said second connection end of said contact; and positioning means for supporting said connector module in said housing aperture in plural different positions, each said position differing in the location of said drop wire entry opening with respect to the longitudinal walls of said housing.

12. A connector block assembly of claim 11 wherein said connector module is supportable in said housing aperture in a first position wherein said front wall portion is positioned adjacent one of said longitudinal walls of said housing whereby said drop wire is insertable into said drop wire entry opening in a first direction perpendicular to said one longitudinal side wall 13.

13. A connector block assembly of claim 12 wherein said connector module is supportable in said housing aperture in a second position, wherein said front wall portion is positioned adjacent to the other of said longitudinal walls of said housing, whereby said drop wire is insertable into said drop wire entry opening in a said direction perpendicular to said other longitudinal side wall and opposite first direction.

14. A connector block of claims 12 or 13 wherein said connector module is generally cylindrical in shape and said housing aperture is circular being defined by an extending annular housing wall, and wherein said positioning means includes:

diametrically opposed keys on said connector module and said annular housing wall includes diametrically opposed key receiving slots, said key receiving slots adapted to receive said keys upon insertion of said connector module in said aperture in either said first or said second positions.

*15. An electrical connector block, comprising:*

*(a) a housing arrangement defining an interior compartment for receipt of conductors of a multiconductor cable;*

*(b) first and second electrical contact members supported by said housing arrangement, each said contact member having a first contact disposed in said interior compartment and a second contact situated exteriorly of said housing arrangement; and*

*(c) a closure for enclosing said second contacts of said first and second electrical contact members, said closure having an interior compartment and defining first and second drop wire entry apertures in an exterior surface thereof and a drop wire support member interiorly in registry with said first and second apertures, said drop wire support member defining contact member passages therethrough enabling electrical engagement of said second contacts with drop wires disposed on said drop wire support member.*

*16. An electrical connector block of claim 15, further including a gel disposed in said closure interior compartment.*

*17. An electrical connector block of claim 15, wherein said closure defines a further aperture in an exterior surface thereof and further including a member disposed in said further aperture and operable for effecting electrical connection of drop wires disposed on said drop wire support member respectively to said second contacts of first and second electrical contact members.*

*18. An electrical connector block of claim 17, wherein said closure apertured exterior surfaces are mutually perpendicular.*

*19. An electrical connector block of claim 17, wherein said operable member comprises an exteriorly threaded member.*

*20. An electrical connector block of claim 15, wherein each of said first and second contact members includes a probe contact and wherein said closure defines respective exteriorly-accessible probe passages communicating with said probe contacts.*

*21. An electrical connector block of claim 20, wherein said probe passages are perpendicular to said contact support member.*

*22. An electrical connector block of claim 15, wherein said closure includes a contact enclosing housing bounding said closure interior compartment and wherein said contact enclosing housing and said dropwire support member are respective separately fabricated elements.*

*23. An electrical connector block of claim 22, wherein said contact enclosing housing defines a further aperture in*

*an exterior surface thereof, said connector block further including a member disposed in said further aperture and operable for displacing said contact enclosing housing relative to said housing arrangement for effecting electrical connection of drop wires disposed on said drop wire support member respectively to said second contacts of first and second electrical contact members.*

*24. An electrical connector block, comprising:*

*(a) a housing arrangement defining an interior compartment for receipt of conductors of a multiconductor cable;*

*(b) first and second electrical contact members supported by said housing arrangement, each said contact member having a first contact disposed in said interior compartment and a second contact situated exteriorly of said housing arrangement;*

*(c) a closure for enclosing said second contacts of said first and second electrical contact members, said closure having an interior compartment and defining first and second drop wire entry apertures in an exterior surface thereof; and*

*(d) a gel disposed in said closure interior compartment, said closure interior compartment defining interior surfaces therein extending from said second contacts of said first and second contact elements to said first and second drop wire entry apertures.*

*25. An electrical connector block of claim 24, wherein said interior surfaces extend also interiorly in said closure interior compartment of said second contacts of said first and second contact elements.*

*26. An electrical connector block of claim 24, wherein said closure defines a further aperture in an exterior surface thereof and further including a member disposed in said further aperture and operable for effecting electrical connection of drop wire respectively to said second contacts of first and second electrical contact members.*

*27. An electrical connector block of claim 26, wherein said closure apertured exterior surfaces are mutually perpendicular.*

*28. An electrical connector block of claim 26, wherein said operable member comprises an exteriorly threaded member.*

*29. An electrical connector block of claim 24, wherein each of said first and second contact members includes a probe contact and wherein said closure defines respective exteriorly-accessible probe passages communicating with said probe contacts.*

*30. An electrical connector block of claim 29, wherein said probe passages communicate with said interior surfaces.*

*31. An electrical connector block of claim 30, wherein said probe passages are perpendicular to said interior surfaces.*

*32. An electrical connector block of claim 24, wherein said closure includes a contact enclosing housing bounding said closure interior compartment and wherein said contact enclosing housing and said interior surfaces are respective separately fabricated.*

*33. An electrical connector block of claim 32, wherein said contact enclosing housing defines a further aperture in an exterior surface thereof, said connector block further including a member disposed in said further aperture and operable for displacing said contact enclosing housing relative to said housing arrangement for effecting electrical connection of drop wires respectively to said second contacts of first and second electrical contact members.*

*34. An electrical connector block of claim 24, wherein said second contacts of said first and second electrical contact members are insulation displacement contacts.*

*35. An electrical connector block, comprising:*

*(a) a housing arrangement defining an interior compartment for receipt of conductors of a multiconductor cable;*

*(b) first and second electrical contact members supported by said housing arrangement, each said contact member having a first contact disposed in said interior compartment and a second contact situated exteriorly of said housing arrangement, each of said first and second contact members including a probe contact;*

*(c) a closure for enclosing said second contacts of said first and second electrical contact members, said closure having an interior compartment and defining first and second drop wire entry apertures in an exterior surface thereof, said closure including cylindrical surfaces therein extending from said second contacts of said first and second contact members to said first and second drop wire entry apertures, said closure defining respective exteriorly-accessible probe passages communicating with said probe contacts, each of said probe passages communicating with said cylindrical surface for supporting said drop wires; and*

*(d) a gel disposed in said closure interior compartment.*

*36. In an electrical connector block having a housing arrangement defining an interior compartment for receipt of conductors of a multiconductor cable and first and second electrical contact members supported by said housing arrangement, each said contact member having a first contact disposed in said interior compartment and both a second contact and a probe contact situated exteriorly of said housing arrangement, the improvement comprising a closure for enclosing said second and probe contacts of said first and second electrical contact members, said closure having an interior compartment containing a gel and defining first and second drop wire entry apertures in a first exterior surface thereof and defining first and second probe entry apertures in a second exterior surface thereof, said closure further defining respective first and second interior surfaces extending from said first and second drop wire entry apertures to said second contacts of said first and second contact members and respective first and second probe passages extending from said first and second probe entry apertures to said first and second interior surfaces.*

*37. The invention claimed in claim 36 wherein said first and second interior surfaces extend also interiorly in said closure compartment of said second contacts of said first and second contact elements.*

*38. The invention claimed in claim 36, wherein said closure defines a further aperture in an exterior surface thereof and further including a member disposed in said further aperture and operable for effecting, electrical connection of drop wires inserted into said closure through said first and second drop wire entry openings to said second contacts of said first and second contact members.*

*39. The invention claimed in claim 38, wherein said operable member comprises an exteriorly threaded member.*

*40. The invention claimed in claim 39, wherein said closure includes a contact enclosing housing and a member defining said first and second interior cylindrical surfaces, said housing and said member defining said first and second interior cylindrical surfaces being separately fabricated.*

* * * * *